United States Patent
Abinet

(10) Patent No.: US 10,167,215 B2
(45) Date of Patent: Jan. 1, 2019

(54) METHOD FOR NITROGEN REMOVAL FROM AQUEOUS MEDIUM

(71) Applicant: Kemira Oyj, Helsinki (FI)

(72) Inventor: Roderick Abinet, Scottsdale, AZ (US)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 15/508,600

(22) PCT Filed: Sep. 3, 2015

(86) PCT No.: PCT/FI2015/050576
§ 371 (c)(1),
(2) Date: Mar. 3, 2017

(87) PCT Pub. No.: WO2016/034774
PCT Pub. Date: Mar. 10, 2016

(65) Prior Publication Data
US 2017/0275192 A1    Sep. 28, 2017

Related U.S. Application Data

(60) Provisional application No. 62/045,041, filed on Sep. 3, 2014.

(51) Int. Cl.
| | | |
|---|---|---|
| *C02F 3/30* | (2006.01) | |
| *C01B 21/02* | (2006.01) | |
| *C01B 21/22* | (2006.01) | |
| *C02F 1/70* | (2006.01) | |
| *C02F 3/00* | (2006.01) | |
| *C01B 13/02* | (2006.01) | |
| *C02F 101/16* | (2006.01) | |

(52) U.S. Cl.
CPC .......... *C02F 3/303* (2013.01); *C01B 13/0203* (2013.01); *C01B 21/02* (2013.01); *C01B 21/22* (2013.01); *C02F 1/70* (2013.01); *C02F 1/705* (2013.01); *C02F 3/006* (2013.01); *C02F 2101/16* (2013.01); *C02F 2101/166* (2013.01); *C02F 2209/06* (2013.01); *C02F 2303/10* (2013.01); *Y02W 10/15* (2015.05); *Y02W 10/30* (2015.05)

(58) Field of Classification Search
CPC .. C02F 3/303; C02F 3/006; C02F 1/70; C02F 2101/16; C02F 2209/06; C02F 2101/166; C01B 21/02; C01B 21/22
USPC ........................................ 210/605, 630, 631
See application file for complete search history.

(56) References Cited

U.S. PATENT DOCUMENTS

2012/0309071 A1    12/2012   Scherson et al.
2016/0272519 A1*    9/2016   Ledwell ................. C02F 3/006

FOREIGN PATENT DOCUMENTS

WO    2014125217 A2    8/2014

OTHER PUBLICATIONS

Scherson Y et al. Nitrogen removal with energy recovery through N2O decomposition. Energy Environ. Sci. 2013, vol. 6, pp. 241-248. The whole document.
Scherson Y et al. Production of Nitrous Oxide From Anaerobic Digester Centrate and Its Use as a Co-oxidant of Biogas to Enhance Energy Recovery. Environmental Science & Technology. May 20, 2014, vol. 48, No. 10, pp. 5612-5619. doi:10.1021/es501009j.ISSN 0013-936X(print). ISSN 1520-5851(electronic). Abstract; chapter Introduction on pp. 5612-5613.
Gao Han et al. Towards energy neutral wastewater treatment: methodology and state of the art. Environmental Science—Processes & Impacts, May 2014, vol. 16, No. 6, pp. 1223-1246. doi:10.1039/c4em00069. ISSN 2050-7887 (print),ISSN 2050-7895(electronic) chapter 2.2. on pp. 1230-1232.
Bruun Hansen Hans et al. Evaluation of the free energy of formation of Fe(II)—Fe(III) hydroxide-sulphate (green rust) and its reduction to nitrite. Geochimica et Cosmochimica Acta. vol. 58, No. 12, 1994, pp. 2599-2608. The whole document.

* cited by examiner

*Primary Examiner* — Fred Prince
(74) *Attorney, Agent, or Firm* — Berggren LLP Law Firm

(57) ABSTRACT

The invention relates to a method for nitrogen removal from aqueous medium, comprising steps of (a) converting $NH_4^+$ in the aqueous medium to $NO_2^-$ by partial aerobic nitrification, (b) partially reducing the obtained $NO_2^-$ to $N_2O$ in anoxic conditions, and (c) decomposing $N_2O$ to $N_2$ with energy recovery. A mixture of ferrous sulfate and ferric sulfate is used in step (b) for reduction of $NO_2^-$ to $N_2O$.

15 Claims, No Drawings

METHOD FOR NITROGEN REMOVAL FROM AQUEOUS MEDIUM

PRIORITY

This application is a U.S. national application of PCT-application PCT/FI2015/050576 filed on Sep. 3, 2015 and claiming priority of U.S. provisional application 62/045,041 filed on Sep. 3, 2014, the contents of all of which are incorporated herein by reference.

The present invention relates to a method for nitrogen removal from aqueous medium according to the preamble of the enclosed independent claim.

Wastewaters may comprise increased levels of nitrogen compounds, such as organic nitrogen and ammonia. In wastewater treatment the goal is to reduce the levels of nitrogen in the water, because nitrogen compounds are, among other things, effective fertilizers and may cause eutrophication of waterways.

Nitrogen can be removed from aqueous solutions by using various different methods. For example, a coupled aerobic-anoxic nitrous decomposition operation, known as CANDO, may be used. The process comprises three steps: (1) partial aerobic nitrification of $NH_4^+$ to $NO_2^-$, (2) partial anoxic denitrification of $NO_2^-$ to $N_2O$, and (3) $N_2O$ conversion to $N_2$ with energy recovery via catalytic decomposition of $N_2O$ or use of $N_2O$ as an oxidant of $CH_4$. It is known that carbonate green rust, $Fe(II)_4Fe(III)_2(OH)_{12}CO_3$, or siderite $FeCO_3$ may be used for reduction of $NO_2^-$ to $N_2O$, see for example, Scherson et al. Energy Environ. Sci. 2013, 6, 241-248. Carbonate green rust may be obtained by allowing a carbonate compound, such as sodium carbonate, to react with $FeCl_2$. However, there is a constant need to improve the existing processes and to search effective and feasible alternatives.

An object of this invention is to minimise or even totally eliminate the disadvantages existing in the prior art.

An object is also to provide a method for effectively removing nitrogen from aqueous medium.

These objects are attained with the invention having the characteristics presented below in the characterising parts of the independent claims.

Typical method according to the invention for nitrogen removal from aqueous medium, comprises the steps of
- converting $NH_4^+$ in the aqueous medium to $NO_2^-$ by partial aerobic nitrification,
- partially reducing the obtained $NO_2^-$ to $N_2O$ in anoxic conditions,
- decomposing $N_2O$ to $N_2$ with energy recovery,
wherein a mixture of ferrous sulfate and ferric sulfate is used for reduction of $NO_2^-$ to $N_2O$.

Now it has also been found out that a mixture of ferrous sulphate and ferric sulphate may be used to reduce $NO_2^-$ to $N_2O$, while maintaining the efficiency and reaction rates of the known CANDO process employing carbonate green rust or siderite. The addition of the mixture of ferrous sulphate and ferric sulphate directly to step (b) produces fresh amorphous iron oxyhydroxide, which enhances the Fe(II)-mediated reduction of $NO_2^-$ in step (b). Therefore it is possible to eliminate the addition of a carbonate source to produce green rust and minimize the number of steps required.

According to one embodiment of the present invention the mixture, which is added to step (b), comprises at least 3 moles of ferrous sulfate to 1 mole of ferric sulfate. Preferably the mixture comprises at least 3.5 moles of ferrous sulfate to 1 mole of ferric sulfate, more preferably at least 4 moles of ferrous sulfate to 1 mole of ferric sulfate. The amount of ferrous sulfate is carefully selected to optimize the effectivity of the partial reduction of $NO_2^-$ to $N_2O$ in step (b).

The mixture of ferrous sulfate and ferric sulfate may be added in step (b) to the aqueous medium in solution form or in form of particular crystalline mixture. The mixture may be added in such amount that at least 2 moles, preferably at least 3 moles, more preferably at least 3.5 moles, ferrous sulphate are added to 1 mole of ferric sulphate and to 1 mole of nitrite. For example, when the mixture is added to a reaction chamber prior to the nitrite sludge holding tank, a maximum off-gas and $N_2O$ gas capture may be obtained. The more iron is added, the more $N_2O$ is released and ammonia removed.

According to embodiment of the invention no buffering agents are added to the aqueous medium. This simplifies the process and makes it more economic.

The aqueous medium, which is treated by the method according to the present invention, comprises $NH_4^+$ and it may be municipal wastewater, industrial wastewater or landfill leachate. The wastewater may be a concentrate, centrate or filtrate from a dewatering process. For example, it may originate from dewatering of municipal wastewater utilizing centrifuges and recycling the centrate stream back to the wastewater process. Alternatively the wastewater may originate from agriculture or production of biofuel, such as bioethanol or biodiesel.

The concentration of $NH_4^+$ in the aqueous medium, before nitrogen removal, is at least double the molar concentration of nitrate, preferably at least triple the molar concentration of nitrate, more preferably at least four times the molar concentration of the nitrate. This ensures an effective conversion to nitrite over nitrate. Furthermore, the mixture of ferrous sulphate and ferric sulphate provides an effective reduction of $NO_2^-$ to $N_2O$, thus enabling improved overall reduction of nitrogen, even from wastewaters comprising elevated levels of nitrogen compounds.

In one embodiment, step (a) is takes place in a separate first tank reactor. The conditions in the first tank reactor are selected so that the bacteria in the rector effectively select nitrite over nitrate. For example, the pH of the medium is kept in the range of 6-8, the amount of dissolved oxygen is kept low, and the reactor temperature is in the range of 20-40° C., preferably 30-35° C. The residence time in step (a) may be 1.5-3.5 days, preferably 2-3 days.

Step (b) takes place in a second tank reactor. The obtained $NO_2^-$ from step (a) is partially reduced abiotically by using Fe(II)-mediated reduction to $N_2O$ and ferric iron. The ferric ion forms in form of a precipitate, which may be removed from the tank reactor. According to one embodiment of the invention ferric iron from step (b) may be regenerated back to ferrous iron by using iron-reducing bacteria, known as such. The regeneration may be performed in a separate regeneration reactor.

According to one embodiment of the invention the reaction time for the reduction reaction in step (b) is <3 h, preferably <2 h, sometimes even <1.5, when the mixture of ferrous sulphate and ferric sulphate is used.

In one embodiment, the decomposition of $N_2O$ to $N_2$ with energy recovery in step (c) may be achieved by decomposition of $N_2O$ to form oxygen and nitrogen gas catalytically, thermally or through exothermic decomposition. Gaseous $N_2O$ may also be used as oxidant or co-oxidant in a combustion reaction, e.g. in the combustion of $CH_4$.

According to one embodiment of the invention signal values from a spectrophotometric measurement are used for measuring $NO_2^-$ concentration level in the aqueous medium on-line and thereafter using the measured $NO_2^-$ concentration level for determination of amount of reduction agent added in step (b). It has been found out that signal values from a spectrophotometric measurement provides a reliable and optimal basis for measuring $NO_2^-$ concentration level on-line, and that the measured $NO_2^-$ concentration level can be used successfully for control of reduction agent addition. Thus the addition of the reduction agent may be carefully and accurately adjusted to the actual nitrogen compound concentration in the aqueous medium, and required nitrogen removal level is obtained without using unnecessary excess amounts of reduction agent.

Signal values from a spectrophotometric measurement may be measured continuously or at predetermined non-constant time intervals. If the measurement is performed non-continuously, the predetermined time interval is preferably <30 min, more preferably <15 min, even more preferably <7 min. The non-continuous measurement is suitable for aqueous media where the concentration of nitrogen compounds is relatively stable and/or the changes in medium composition are relatively slow. According to one preferred embodiment of the present invention the signal values from a spectrophotometric measurement are measured continuously and thus provide continuous information about $NO_2^-$ concentration level.

According to one embodiment of the invention the $NO_2^-$ concentration level is measured before the addition of the reduction agent. This means that the $NO_2^-$ concentration level is measured before step (b) of the nitrogen removal process. The spectrophotometric measurement may be performed, for example, from the aqueous medium entering the nitrogen removal process or from the aqueous medium entering the step (b) of the nitrogen removal process. The obtained signal values from the spectrophotometric measurement are used to determine the $NO_2^-$ concentration level and consecutively the reduction agent amount which is added in step (b). This allows for predictive control of the reduction agent addition.

According to another embodiment of the invention the $NO_2^-$ concentration level is measured after the addition of the reduction agent. This means that the $NO_2^-$ concentration level is measured after step (b) of the nitrogen removal process. The spectrophotometric measurement may be performed, for example, from the aqueous medium leaving the nitrogen removal process or from the aqueous medium leaving the step (b) of the nitrogen removal process. The obtained signal values from the spectrophotometric measurement is used for to determine the $NO_2^-$ concentration level and consecutively the reduction agent amount which is added in step (b) is determined by using a feedback loop.

According to one embodiment the $NO_2^-$ concentration level is measured both before and after the addition of the reduction agent. This provides for the optimal control of the reduction agent addition.

The signal values from a spectrophotometric measurement are obtained by using spectrophotometric measurement device, preferably UV/VIS-spectrophotometric measurement device. A suitable spectrophotometric measurement device is, for example, an s::can Spectro:: Lyser™ probe (Messtechnik GmbH, Vienna, Austria). According to one preferred embodiment of the invention the signal values from a spectrophotometric measurement are measured at wavelength range from 200-250 nm. The spectrophotometric measurement device may be construed as a submersible sensor, and it may be mounted to a suitable process line in the nitrogen removal process. The measurement device may be equipped with an auto-cleaning system using e.g. pressurized air for cleaning the required device surfaces.

The spectrophotometric measurement device provides signal values that are proportional to $NO_2^-$ concentration level in the aqueous medium. The obtained signal values may be directly proportional to the $NO_2^-$ concentration level, or the signal values may be processed, e.g. mathematically, in order to obtain the $NO_2^-$ concentration level in the aqueous medium.

According to one embodiment of the invention the signal values from the spectrophotometric measurement are transferred to a central unit, where the signal values processed and corresponding $NO_2^-$ concentration level is calculated. The signal values may be transferred from the spectrophotometric measurement device to the control unit, e.g. via cable or wirelessly, e.g. via GPRS. The central unit may comprise necessary units for processing, calculating and/or storing the signal values from the spectrophotometric measurement and/or obtained $NO_2^-$ concentration levels. The central unit may also comprise a computing unit, which comprises suitable software, and calculates the required addition of the reduction agent based on the obtained $NO_2^-$ concentration level. The computing unit may be a general industrial process control computer or SCADA (Supervisory Control and Data Acquisition) unit. The computing unit may be arranged to provide a steering signal for the addition means, e.g. pumps, which control the addition of the reduction agent to step (b) of the nitrogen removal process. The steering signal may be provided through an analog hard wire, e.g. 4-20 A hard wire, or modbus to the addition means. The addition means, e.g. pumps, may be equipped with a mag-flow meter, which automatically reads the reduction agent output value. This output value may be fed back to the computing unit and used to follow the addition for accuracy.

According to one embodiment of the invention spectrophotometric signal values are processed mathematically in the control unit in order minimize the disturbances caused by random fluctuations and/or other disturbing species present. For example, partial least square regression may be used to calculate more accurate $NO_2^-$ concentration level from the spectrophotometric signal values. It is also possible to use suitable multivariate calibration algorithms to calculate the amount of the reduction agent to be added from the obtained spectrophotometric signal values.

The signal values from the spectrophotometric measurement and/or $NO_2^-$ concentration level values may be stored to a database.

According to one embodiment of the invention pH value of the aqueous medium is measured and used for correcting the measured spectrophotometric signal values before determination of amount of reduction agent added in step (b). The measurement of pH values is preferred if there is risk for pH fluctuations in the aqueous medium. The pH values may be measured by using any suitable pH probe, known as such. The obtained pH values may be transferred to the central unit, where they may be processed and used to correct the signal values from the spectrophotometric measurement. After pH correction, the $NO_2^-$ concentration level is calculated from the corrected spectrophotometric signal values. The pH measurement may be performed continuously or at predetermined time intervals, preferably continuously. The pH measurement may be performed in one or several locations of the nitrogen removal process.

It is also possible to measured levels or concentrations of other species, which may influence the spectrophotometric measurement, and correct the signal values accordingly with the obtained measurement levels.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. Method for nitrogen removal from aqueous medium, comprising steps of
   (a) converting $NH_4^+$ in the aqueous medium to $NO_2^-$ by partial aerobic nitrification,
   (b) partially reducing the obtained $NO_2^-$ to $N_2O$ in anoxic conditions,
   (c) decomposing $N_2O$ to $N_2$ with energy recovery,
   wherein a mixture of ferrous sulfate and ferric sulfate is used in step (b) for reduction of $NO_2^-$ to $N_2O$.

2. Method according to claim 1, wherein the mixture comprises at least 3 moles of ferrous sulfate to 1 mole of ferric sulfate.

3. Method according to claim 1, wherein the mixture of ferrous sulfate and ferric sulfate is applied in step (b) to the aqueous medium in solution form or in form of particular crystalline mixture.

4. Method according to claim 1, wherein the reaction time for the reduction reaction in step (b) is <2 h.

5. Method according to claim 1, wherein the aqueous medium is a concentrate, centrate or filtrate from a dewatering process.

6. Method according to claim 1, wherein the concentration of $NH_4^+$ in the aqueous medium, before nitrogen removal, is at least double the molar concentration of nitrate.

7. Method according to claim 1, wherein signal values from a spectrophotometric measurement are used for measuring $NO_2^-$ concentration level in the aqueous medium on-line and thereafter using the measured $NO_2^-$ concentration level for determination of amount of reduction agent added in step (b).

8. Method according to claim 7, wherein the signal values from the spectrophotometric measurement are measured continuously.

9. Method according to claim 7, wherein $NO_2^-$ concentration level is measured before the addition of the reduction agent.

10. Method according to claim 7, wherein $NO_2^-$ concentration level is measured after the addition of the reduction agent.

11. Method according to claim 7, wherein the signal values from the spectrophotometric measurement are measured at wavelength range from 200-250 nm.

12. Method according to claim 7, wherein the signal values from the spectrophotometric measurement are transferred to a central unit, where the signal values are processed and corresponding $NO_2^-$ concentration level is calculated.

13. Method according to claim 7, wherein pH value of the aqueous medium is measured and used for correcting the measured spectrophotometric signal values before determination of amount of reduction agent added in step (b).

14. Method according to claim 6, wherein the concentration of $NH_4^+$ in the aqueous medium, before nitrogen removal, is at least triple the molar concentration of nitrate.

15. Method according to claim 14, wherein the concentration of $NH_4^+$ in the aqueous medium, before nitrogen removal, is at least four times the molar concentration of nitrate.

* * * * *